United States Patent
Plettinck et al.

(10) Patent No.: US 11,829,194 B2
(45) Date of Patent: Nov. 28, 2023

(54) METHOD AND SYSTEM FOR DERIVING A DIGITAL REPRESENTATION OF AN UNFOLDED BLANK AND FOR COST ESTIMATION BASED UPON THE SAME

(71) Applicant: ESKO Software BVBA, Ghent (BE)

(72) Inventors: Lieven Plettinck, Wingene (BE); Richard C. Deroo, Reading, MA (US); Rian Goossens, Lokeren (BE)

(73) Assignee: Esko Software BV, Ghent (BE)

( * ) Notice: Subject to any disclaimer, the term of this patent is extended or adjusted under 35 U.S.C. 154(b) by 308 days.

(21) Appl. No.: 17/095,803

(22) Filed: Nov. 12, 2020

(65) Prior Publication Data

US 2021/0350037 A1    Nov. 11, 2021

Related U.S. Application Data

(60) Provisional application No. 63/021,890, filed on May 8, 2020.

(51) Int. Cl.
*G06F 30/12* (2020.01)
*G06K 19/06* (2006.01)
(Continued)

(52) U.S. Cl.
CPC ............. *G06F 30/12* (2020.01); *G06F 30/17* (2020.01); *G06K 19/06037* (2013.01); *G06F 2111/20* (2020.01)

(58) Field of Classification Search
CPC ...... G06F 30/12; G06F 30/17; G06F 2111/20; G06F 30/10; G06F 2111/10;
(Continued)

(56) References Cited

U.S. PATENT DOCUMENTS 3,069,654 A    12/1962 Hough
6,201,546 B1    3/2001 Bodor et al.
(Continued)

FOREIGN PATENT DOCUMENTS

EP    2120168 A1    11/2009
EP    2036049 B1    4/2012
(Continued)

OTHER PUBLICATIONS

Butler, C. "Create a Dieline From a Flattened Box Scan—How To Save a Bad Dieline" [blog post] [retrieved on Oct. 24, 2022] Retrieved from <<http://claytowne.com/beats-digging-ditches/create-a-dieline-from-a-flattened-box-scan>> (Year: 2012).*
(Continued)

*Primary Examiner* — Rehana Perveen
*Assistant Examiner* — Alfred H B Wechselberger
(74) *Attorney, Agent, or Firm* — RatnerPrestia

(57) ABSTRACT

A computer-implemented method for creating a computer-aided design (CAD) corresponding to a 2-dimensional rendering of an unfolded blank configured for manipulation into a 3-dimensional shape. The method includes obtaining a first digital, non-CAD design file containing information relating to the unfolded blank geometry but lacking metadata that defines cut or crease lines separately from surrounding content, and deriving, with a computer processor, a digital representation of the unfolded blank geometry based upon the first digital non-CAD design file. The digital representation includes defined data corresponding to a shape having one or more defined cut and/or crease lines. A system for performing the method includes a computer processor and machine-readable media accessible by the computer processor comprising non-transitory, instructions readable by the computer processor for performing the method steps of defining the digital non-CAD design file and deriving the digital representation therefrom.

35 Claims, 10 Drawing Sheets

(51) Int. Cl.
*G06F 30/17* (2020.01)
*G06F 111/20* (2020.01)

(58) Field of Classification Search
CPC ...... G06F 2113/20; G06F 30/00; G06F 30/18; G06F 2111/00–2119/22; G06K 19/06037; Y02P 90/30; G06Q 10/043; G06Q 50/04; G06T 17/00
See application file for complete search history.

(56) References Cited

U.S. PATENT DOCUMENTS

| | | | |
|---|---|---|---|
| 7,055,350 | B2 | 6/2006 | Bonnain et al. |
| 7,346,408 | B2 | 3/2008 | Van Bael et al. |
| 7,440,874 | B2 | 10/2008 | Durney et al. |
| 7,612,773 | B2 | 11/2009 | Magnin et al. |
| 8,170,706 | B2 | 5/2012 | Gombert et al. |
| 8,174,720 | B2 | 5/2012 | Gombert et al. |
| 8,185,364 | B2 | 5/2012 | Herman et al. |
| 8,599,290 | B2 | 12/2013 | Chan et al. |
| 8,648,855 | B2 | 2/2014 | Pedersen |
| 8,775,130 | B2 | 7/2014 | Walker et al. |
| 8,830,223 | B2 | 9/2014 | Evans |
| 8,869,083 | B1 | 10/2014 | Morgana et al. |
| 8,994,734 | B2 | 3/2015 | Morgana et al. |
| 9,245,209 | B2 | 1/2016 | Eschbach et al. |
| 9,314,986 | B2 | 4/2016 | Morgana et al. |
| 9,519,734 | B2 | 12/2016 | Randolph |
| 9,827,688 | B2 | 11/2017 | Bain et al. |
| 9,892,212 | B2 | 2/2018 | Eschbach et al. |
| 9,914,278 | B2 | 3/2018 | Pettersson et al. |
| 9,916,401 | B2 | 3/2018 | Eschbach et al. |
| 9,916,402 | B2 | 3/2018 | Eschbach et al. |
| 9,930,326 | B2 | 3/2018 | Roulet et al. |
| 10,356,400 | B2 | 7/2019 | Roulet et al. |
| 10,504,215 | B2 | 12/2019 | Tsarenko et al. |
| 10,504,231 | B2 | 12/2019 | Fiala |
| 10,540,453 | B2 | 1/2020 | Eschbach et al. |
| 2011/0147445 | A1 | 6/2011 | Horn et al. |
| 2015/0121772 | A1 | 5/2015 | Berken et al. |
| 2015/0213155 | A1* | 7/2015 | Eschbach ............... G06F 30/00 493/56 |
| 2016/0012611 | A1 | 1/2016 | Wexler et al. |
| 2018/0108185 | A1 | 4/2018 | Capoia |
| 2019/0362541 | A1 | 11/2019 | Balestra et al. |
| 2019/0392593 | A1 | 12/2019 | Roa et al. |
| 2019/0392613 | A1 | 12/2019 | Roa et al. |
| 2020/0117338 | A1 | 4/2020 | Lukac et al. |

FOREIGN PATENT DOCUMENTS

| | | |
|---|---|---|
| EP | 3308350 A1 | 4/2018 |
| EP | 3510560 A1 | 7/2019 |
| WO | 03024805 A1 | 3/2003 |
| WO | 2007028486 A2 | 3/2007 |
| WO | 2007139697 A2 | 12/2007 |
| WO | 2016074065 A1 | 5/2016 |
| WO | 2016199080 A1 | 12/2016 |
| WO | 2016202960 A1 | 12/2016 |
| WO | 2018046352 A1 | 3/2018 |
| WO | 2019246471 A1 | 12/2019 |

OTHER PUBLICATIONS

"Autodesk Exchange Apps: QR Codes I AutoCAD" youtube.com [retrieved on Oct. 24, 2022]. Retrieved from << https://www.youtube.com/watch?v=5v4cSTqhe_k>> (Year: 2012).*

"How to save a scanned document as a PDF" Computer Hope [retrieved on Oct. 24, 2022]. Retrieved from <<https://www.computerhope.com/issues/ch001282.htm>> (Year: 2019).*

Vaxiviere et al. "Celesstin: CAD Conversion of Mechanical Drawings" Computer, vol. 25, Issue 7; DOI: 10.1109/2.144439 [retrieved on Aug. 23, 2022] (Year: 1992).*

Prasad et al. "CASNS—a heuristic algorithm for the nesting of irregular-shaped sheet-metal blanks" Computer-Aided Engineering Journal, Apr. 1991, pp. 69-73 [retrieved on Aug. 23, 2022] (Year: 1991).*

Kasturi et al. "A System for Interpretation of Line Drawings" IEEE Transactions on Pattern Analysis and Machine Intelligence, vol. 12, No. 10, Oct. 1990 [retrieved on Aug. 23, 2022] (Year: 1990).*

Filipski et al. "Automated Conversion of Engineering Drawings to CAD Form" Proceedings of the IEEE, vol. 80. No. 7. Jul. 1992 [retrieved on Aug. 22, 2022] (Year: 1992).*

Sabbavarapu et al. "A Novel Physical Synthesis Methodology in the VLSI Design Automation by Introducing Dynamic Library Concept" 2013 International Symposium on Electronic System Design; DOI 10.1109/ISED.2013.27 [retrieved on Sep. 20, 2022] (Year: 2013).*

Rigaud et al. "Automatic text localisation in scanned comic books" 9th International Conference on Computer Vision Theory and Applications, Feb. 2013, Barcelona, Spain; hal-00841492 [retrieved on Aug. 22, 2022] (Year: 2013).*

Gilliot et al. "Thin linear network extraction NEXSYS: a knowledge-based system for SPOT images" Proc. SPIE 1771, Applications of Digital Image Processing XV, (Jan. 12, 1993); doi: 10.1117/12.139117 [retrieved on Aug. 22, 2022] (Year: 1993).*

Harris et al. "A Modular System for Interpreting Binary Pixel Representations of Line-Structured Data" In Pattern Recognition Theory and Applications, Springer, Dordrecht, 1982. pp. 311-351 [retrieved on Aug. 22, 2022] (Year: 1982).*

Jaynes et al. "Task Driven Perceptual Organization for Extraction of Rooftop Polygons" Proceedings of 1994 IEEE Workshop on Applications of Computer Vision; DOI: 10.1109/ACV.1994.341303 [retrieved on Aug. 22, 2022] (Year: 1994).*

Lomeli-Illescas et al. "A tool for the automatic generation and analysis of regular analog layout modules" Integration, the VLSI Journal vol. 65 (2019), pp. 81-87 [retrieved on Aug. 23, 2022] (Year: 2019).*

Adobe Illustrator CS3 [User guide] Chapter 6 [retrieved on Apr. 7, 2023] Retrieved from <<https://www.adobe.com/support/documentation/archived_content/en/illustrator/cs3/illustrator_cs3_help.pdf>> (Year: 2007).*

Adobe Photoshop CS3 [User guide] Chapter 10 [retrieved on Apr. 7, 2023] Retrieved from <<https://help.adobe.com/archive/en_US/photoshop/cs3/photoshop_cs3_help.pdf>> (Year: 2007).*

Invitation to Pay Additional Fees with Partial International Search Report for International Application No. PCT/EP2020/083844, dated Feb. 23, 2021, 16 pages.

Coleman, D., "How to Rotate Photos in Lightroom", Feb. 2, 2020, 14 pages, XP055796115, Retrieved from the Internet: https://havecamerawilltravel.com/lightroom/how-rotate-photos/ [retrieved on Apr. 16, 2021].

Velarga, M., "What is a Dieline in Packaging & Print", Oct. 14, 2016, 7 pages, XP055795849, Retrieved from the Internet: https://pakfactory.com/blog/what-is-a-dieline/ [retrieved on Apr. 15, 2021].

International Search Report and Written Opinion for International Application No. PCT/EP2020/083844, dated May 3, 2021, 34 pages.

Duda et al., "Use of the Hough Transformation to Detect Lines and Curves in Pictures", Comm. ACM, vol. 15, No. 1, Jan. 1972, pp. 11-15.

Selinger, P., "Potract: A Polygon-based Tracing Algorithm", Sep. 20, 2003; http://potrace.sourceforge.net/potract.pdf, retrieved form the internet Jan. 8, 2020, 16 pages.

Andy, "Using Scan2CAD: How to Convert Your Image to DWG", Drawing Board by Scan2CAD, dated Jun. 14, 2016, 7 pages.

Khattack et al., "Marker Based Thermal-Inertial Localizations for Aerial Roberts in Obscurant Filled Environments", Autonomous Robots Lab, University of Nevada, Reno, NV, USA, http://www.autonomousrobotslab.com, dated Mar. 2, 2019, 10 pages.

Packly, Create online custom printed packagin, dielines and 3Ds, dated Mar. 26, 2020, 7 pages.

(56) References Cited

OTHER PUBLICATIONS

International Preliminary Report on Patentability and Written Opinion for International Application No. PCT/EP2020/083844, dated Nov. 8, 2022, 24 pages.

* cited by examiner

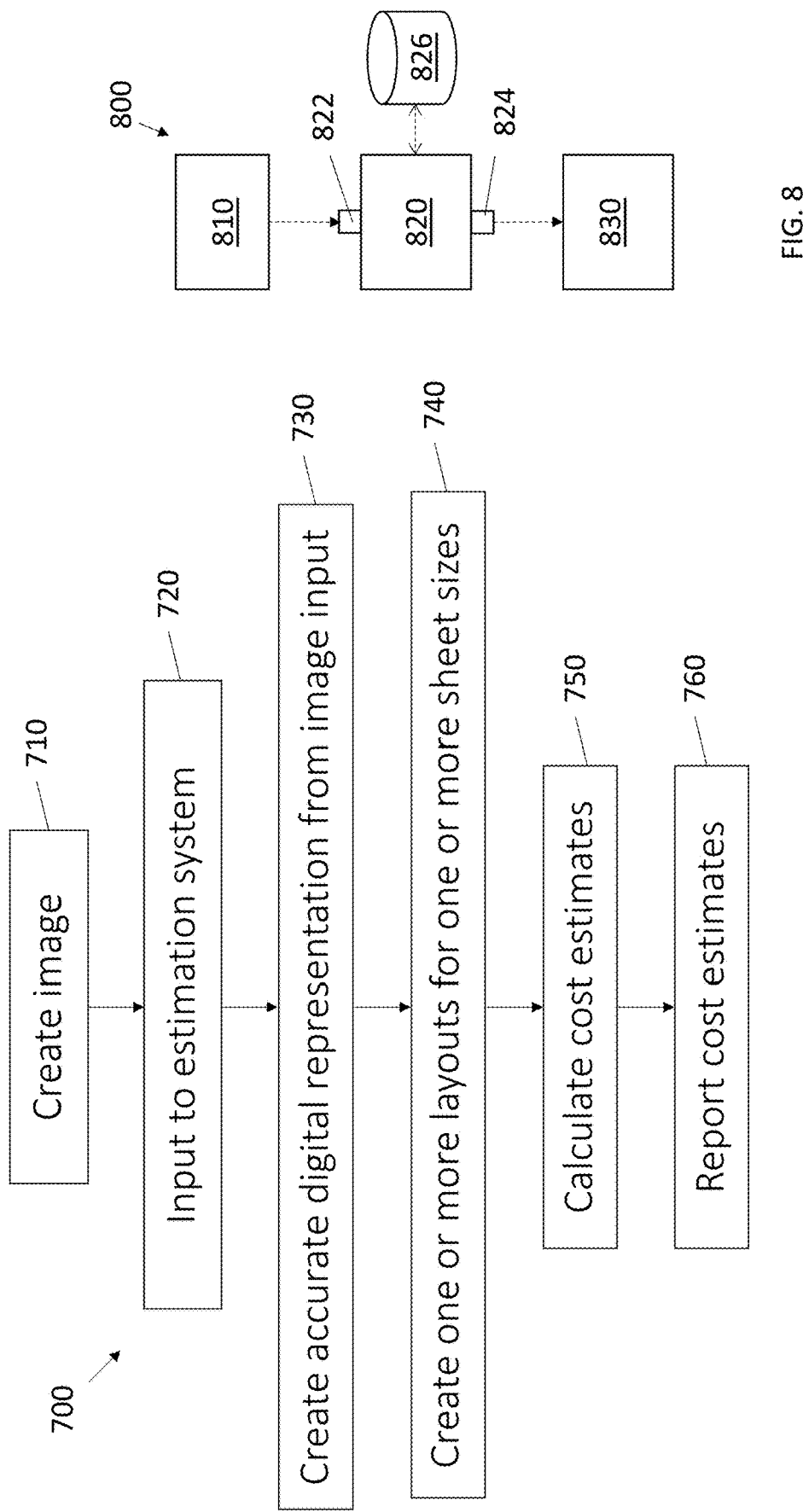

METHOD AND SYSTEM FOR DERIVING A DIGITAL REPRESENTATION OF AN UNFOLDED BLANK AND FOR COST ESTIMATION BASED UPON THE SAME

CROSS-REFERENCE TO RELATED APPLICATIONS

This application claims priority to U.S. Provisional Application Ser. No. 63/021,890, filed May 8, 2020, titled "METHOD AND SYSTEM FOR DERIVING A DIGITAL REPRESENTATION OF AN UNFOLDED BLANK AND FOR COST ESTIMATION BASED UPON THE SAME," incorporated herein by reference in its entirety.

BACKGROUND OF THE INVENTION

In the packaging industry, folding carton packaging manufacturing companies (typically referred to as "converters") often receive requests for price quotes for producing a specified quantity of boxes. To be able to determine the price, the converter needs to estimate the production cost of the specified quantity of boxes. The production cost needs to be relatively accurate, because a quote that is too low may result in a financial loss, while a quote that is too high may result in loss of business. The estimation of production cost may include, but is not limited to, material cost (folding carton board, ink, foils, varnishes, and the like), tool cost (printing plates, dies, and the like), manual labor, machine cost of the printing and finishing equipment, shipping cost. Material cost, and more specifically the cost of the folding carton board, is one of the main elements in such a production cost estimate.

To determine the cost of the folding carton board, the converter needs to determine how many sheets of what size stock are needed to produce the specified amount of boxes. For example, the flat unfolded shape 100 depicted in FIG. 1 represents the outline geometry of the unfolded "blank" to be cut from a sheet of carton stock and then folded into a box. If the converter plans to produce the boxes using sheets of 750 mm×350 mm stock, he or she must then determine how many blanks will fit on the sheet, to minimize waste. This requires generation of a layout, such as layout 200 depicted in FIG. 2 below, in which two blanks 100 fit on the sheet 210.

Given the order quantity for the boxes, the converter can now determine he needs a number of sheets equal to half the order quantity, plus the setup waste on each of the machines.

For simplicity, a single quantity for a single blank geometry on a single sheet size is referenced in the above example, but in reality, the customer may request a price for multiple quantities (e.g. staggered pricing, such as 1000, 10,000, 100,000 units) for multiple blank geometries. The converter may want to determine production cost for different sheet sizes. These different sheet sizes can be sheet sizes available in stock or there may be different sheet sizes for different production methods (e.g. a sheet size for printing on a large format offset press plus finishing on a large format die cutter and an additional sheet size for printing on a smaller digital press plus finishing on a small format die cutter).

Responding to such a request for a quote requires generation, evaluation and comparison of many layouts. In an ideal world, the converter has a digital computer-aided-design (CAD) design of the blank in a supported CAD design file format (e.g. an ArtiosCAD™ ARD file, a CFF2 file, or others well known to those in the field, although as noted herein, other file types having isolated or isolatable information corresponding to the blank geometry may be considered a suitable CAD design file for purposes of ease of import into a CAD system). Using the CAD design of the blank, a layout can be made using tools such as Esko ArtiosCAD™ software. ArtiosCAD™ software has functionality to determine the best layout (i.e. with the highest number of blanks on the sheet) automatically.

However, in many cases the prospective customer has no access to the digital data. In some instances, the geometry of the blank may be embedded as contours in a graphics file (e.g. a PDF), from which the blank geometry must be extracted and converted from other surrounding objects into a CAD design of the blank. For PDFs with the blank geometry embedded as a discrete layer, such extraction may be straightforward. Sometimes, however, the geometry of the blank is contained in the same layer or separation as other information, and requires time-consuming manual processing to extract the blank geometry from the cluttered graphics file in a form usable to the CAD software.

In still other instances, the prospective customer has only physical samples. In this situation, the converter now has a number of choices:

- A rough "guesstimate" may be made of the number of blanks that should fit on a sheet based on visual assessment. The risk of errors of this approach is high.
- Physical samples may be manually positioned on a physical sheet by a human operator and shifted around to find a good layout. Again, the risk of error is high and this is time consuming.
- The physical sample may be given to a CAD designer, who measures the physical sample and creates a digital CAD file representing the physical samples. One advantage of this approach is that after creation of the CAD file, the layout tools mentioned above can be used. While this approach leads to accurate results, it is time consuming.

The workflow for the physical sample approach can be characterized as having the following steps:

1. The customer service representative (CSR) at the converter receives a request for quote by a print buyer, such as for example, along with a physical sample of the box.
2. The CSR sends a design request to a CAD designer.
3. The CAD designer makes a CAD drawing using measurements of the dimension of the physical sample.
4. The CAD designer makes a set of layouts for the CAD drawing for a set of alternative sheet sizes.
5. The CAD designer provides the results back to the CSR.
6. The CSR calculates the material price needed to produce the required amount of boxes
7. The CSR adds other production costs and determines a price quote for the customer.

Thus, there is a need in the field for systems and methods to create a CAD design of a shape, such as packaging blank, from a non-CAD file such as an image of a physical sample or a cluttered graphics file, as well as for systems and methods for quickly determining the number of sheets (and other costs) needed to produce a given quantity of a packaging blank using such a CAD design in a fast and automated manner.

SUMMARY OF THE INVENTION

One aspect of the invention comprises a method implemented by a computer for creating a computer-aided design (CAD) file corresponding to a 2-dimensional rendering of an unfolded blank configured for manipulation into a 3-dimensional shape, such as an unfolded blank configured to be manipulated along the cut and crease lines into the 3-dimensional shape of a packaging box. The method comprises the steps of obtaining, in a computer processor, a first digital, non-CAD design file containing information relating to the unfolded blank geometry, the non-CAD design file having an absence of metadata that defines cut or crease lines separately from surrounding content, and deriving, with the computer processor, a digital representation of the unfolded blank geometry based upon the first digital non-CAD design file. The digital representation includes defined data corresponding to a shape having one or more defined cut and/or crease lines.

In some embodiments, the first digital non-CAD design file comprises an image file, and the image file may include a marker with known geometry and dimensions, wherein deriving the digital representation includes using the marker to determine dimensions of the unfolded blank. The step of deriving the digital representation may further include using the marker to identify and compensate for artifacts in the image, such as rotation relative to a preferred rotation, perspective relative to a plan view, and scaling. The marker may comprise a plurality of fiducials, including one or more QR codes, distributed in a pattern, such as three QR codes positioned in locations corresponding to vertices of a right triangle. The marker may embody encoded information readable by a machine as dimensional and positional information about the plurality of fiducials, or the encoded information may be readable by a machine as identifying information of an address on a network accessible to the machine where machine-readable dimensional and positional information about the plurality of fiducials is stored.

One method of deriving the digital representation from an image file may comprise, after compensating for artifacts in the image to create a straightened image, the processor performing the steps of generating a CAD design mask from the straightened image, the mask comprising a first set of one or more cutting lines that form a boundary. The mask may then be applied to the straightened image, a line detection algorithm performed within the portion of the image bounded by the mask, and lines connected on one side to the first set of cutting lines identified as a second set of one or more cutting lines, and lines connecting two lines from the first or second sets of cutting lines identified as crease lines.

In other embodiments, the information in the non-CAD design file relating to the unfolded blank geometry comprises one or more lines in a cluttered graphics file, such as a PDF file lacking metadata that defines cut or crease lines. In such embodiments, the step of deriving the digital representation may include the processor performing substeps including first collecting lines and curves from the cluttered graphics file and associating each of the collected lines and curves into one or more groups in accordance with one or more grouping rules. Then, each of the one or more groups is cleaned up to remove dangling lines and arrows and to close any unwanted gaps between lines, and the groups corresponding to the blank is identified and converted to an isolated CAD design mask comprising first set of one or more cutting lines that form a boundary. The isolated CAD design mask may be further processed by the processor performing the substeps of identifying all straight lines within the mask boundary, removing arrows, identifying lines connected on one side to the first set of cutting lines as one or more additional cutting lines in a second set of cutting lines, and identifying lines connecting two lines from the first or second sets of cutting lines as crease lines.

In some embodiments, the step of deriving the digital representation may include matching, with the computer processor, the geometry from the CAD design derived from the non-CAD design file to a stored digital representation in a digital memory.

The digital representation as derived by any of the foregoing methods may be used for defining a plurality of candidate layouts on a set of one or more sheets; and calculating material consumption costs associated with each of the plurality of candidate layouts. Die making cost and production time for each candidate layout may also be calculated, and an optimal cost solution from the plurality of candidate layouts. Defining the plurality of candidate layouts may comprise searching for one or more pre-existing stored candidate layouts in a digital memory library, and may further include identifying from information stored in the digital memory library the existence of a premade die corresponding to one or more of the pre-existing stored candidate layouts.

Another aspect of the invention comprises a system for creating a computer-aided design (CAD) file corresponding to a 2-dimensional rendering of an unfolded blank configured for manipulation into a 3-dimensional shape. The system comprises a computer processor and machine-readable media accessible by the computer processor comprising non-transitory, instructions readable by the computer processor. The instructions include instructions defining a first digital non-CAD design file containing information relating to the unfolded blank having an absence of metadata that defines cut or crease lines separately from surrounding content; and instructions for causing the processor to execute steps for deriving a digital representation including defined data corresponding to a shape having one or more defined cut or crease lines of the unfolded blank based upon the first digital non-CAD design file.

In some embodiments, the first digital non-CAD design file may be an image file, in which case the system may further comprise an image capture device, such as scanner or a digital camera, configured to create the image file and connected to a common network with the machine-readable media accessible by the computer processor. The image file may includes a marker with known geometry and dimensions, wherein the computer processor is programmed with instructions for using the marker to determine dimensions of the unfolded blank for the digital representation.

In some embodiments, the first digital non-CAD design file may be a cluttered graphics file. Some embodiments may include a digital memory, wherein the computer processor is configured to match the geometry of the CAD design derived from the non-CAD design file to a stored digital representation in a digital memory, search for one or more pre-existing stored candidate layouts in the digital memory, or a combination thereof. In some embodiments, the computer processor may be further configured with machine-readable instructions for using the digital representation to define a plurality of candidate layouts on a set of one or more sheets; and calculating material consumption costs associated with each of the plurality of candidate layouts.

Yet another aspect of the invention includes a marker configured for inclusion in a digitally captured image file of an unfolded 2-dimensional blank configured for manipulation into a 3-dimensional shape, the image file for use in a method for creating a CAD design file including one or more defined cut lines corresponding to the blank, the marker comprising a plurality of fiducials distributed in a pattern, one or more of the fiducials comprising a QR code having predetermined geometry and dimensions. The marker may include three QR codes positioned in locations corresponding to vertices of a right triangle. Each QR code may embody encoded information readable by a machine as dimensional and positional information about the QR code, or encoded information readable by a machine as identifying information of an address on a network accessible to the machine where machine-readable dimensional and positional information about the QR code is stored. Additional aspects of the invention include a graphics file comprising such a marker, and an image file comprising machine readable language corresponding to a captured image of the marker and a captured image of the blank.

BRIEF DESCRIPTION OF THE DRAWINGS

FIG. 7 is a flowchart corresponding to an embodiment of one aspect of the invention for converting an image of a physical specimen to a CAD design.

FIG. 8 is a schematic illustration of an exemplary system embodiment of the invention.

DETAILED DESCRIPTION OF THE INVENTION

As used herein, the term "blank geometry" refers to a collection of lines and paths indicating where the flat substrate e.g. folding carton board will be cut, creased or folded. The term "CAD design" refers to any data structure in computer memory representing an accurate digital representation of the blank geometry in which the data structure representing the blank geometry is isolated or isolatable from other data structures. In practice, it has been found that an accuracy of within 0.2 mm is a suitable degree of accuracy for digital representation to produce reliable estimation results, but the invention is not limited to any particular degree of accuracy. The term "CAD design" is not intended to be limited to any specific machine readable format, and in particular, is not limited only to formats traditionally associated with industrial CAD systems. For example, a PDF may serve as a CAD Design with the data structure representing the blank geometry all rendered in a specific spot color such that it can be readily isolated from other information in the same layer. The term "computer memory" refers to any media in any form in which machine-readable code may be stored, including but not limited to portable media (e.g. optical, magnetic, flash), local memory, and memory accessible via a network, such as "in the cloud." The term "CAD design mask" refers to the outline of the blank geometry defined by the CAD design, but lacking any cut and/or crease lines inside the boundaries of that outline. A "CAD design file" as referenced herein comprises a CAD design stored in a file in computer memory of any type in any format. A "non-CAD design file" is a file having an absence of metadata that define cut or crease lines separately from surrounding content. Exemplary non-CAD design files include but are not limited to image files, such as captured with a camera as described herein, or a "cluttered" graphics file that contains many other objects in addition to the outline of the blank, such as measurements, bleed lines, as well as graphic content for printing on the resulting packaging. A "layout" refers to the positioning of one or more CAD designs on a sheet, which is later cut along the defined cut and/or crease lines to form a blank, such as a blank configured for assembly into a packaging box.

Figure 2:
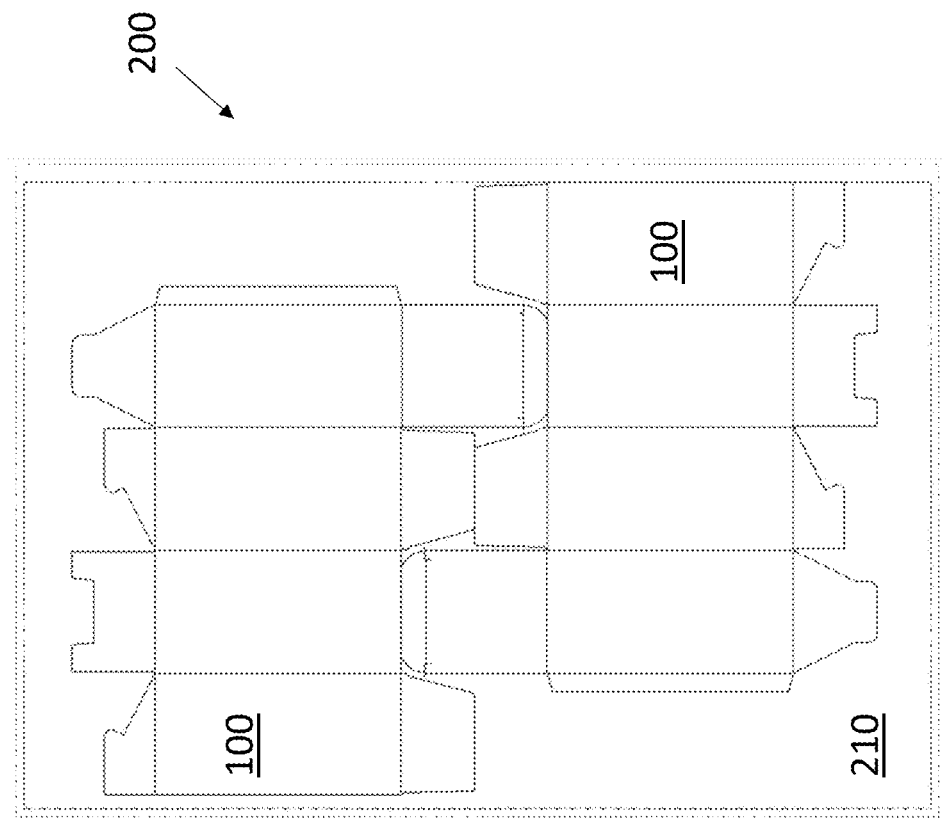
FIG. 2 is a schematic illustration of an exemplary layout comprising a plurality of the blanks of FIG. 1 laid out on a sheet.
Figure 1:
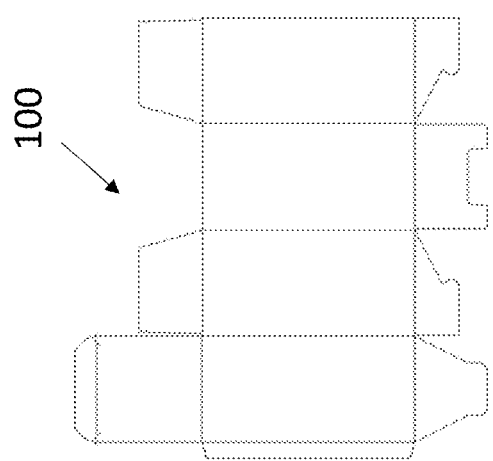
FIG. 1 is a schematic illustration of a CAD design corresponding to a 2D blank configured for folding into a 3D shape.
Figure 4:
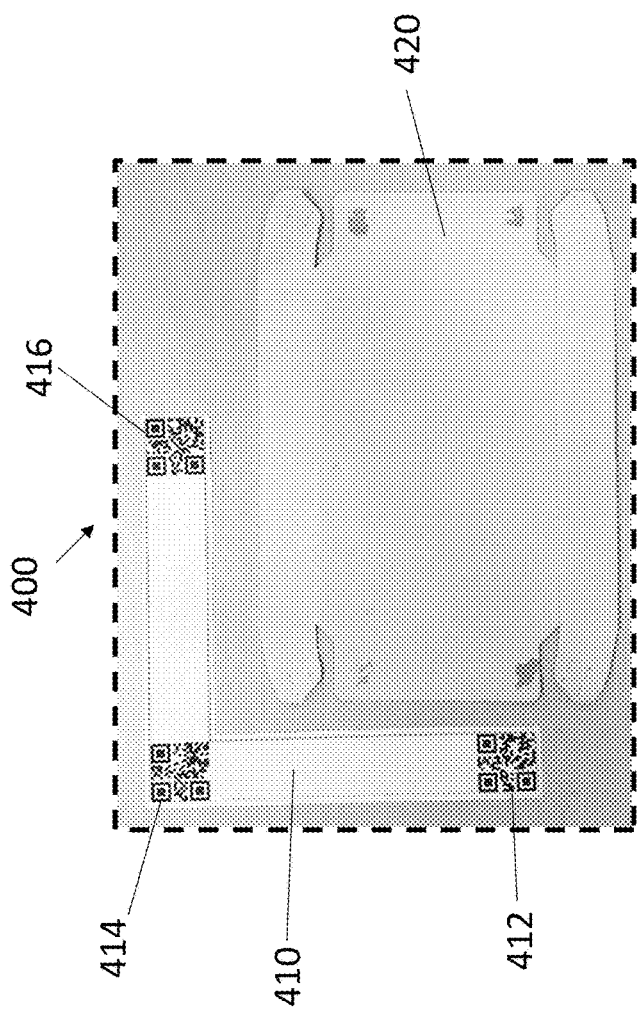
FIG. 4 is a photographic image of an exemplary blank together with a marker having fiducials.
Figure 3:
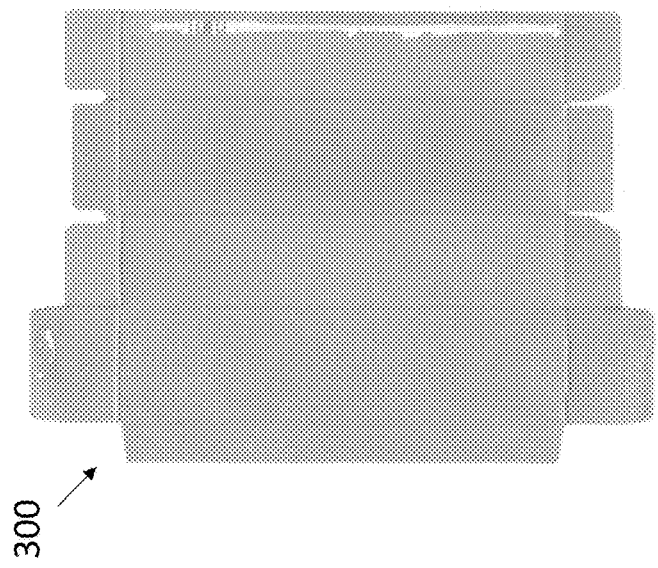
FIG. 3 is a scanned image of an exemplary blank.

An exemplary workflow 700 in accordance with the invention is illustrated in FIG. 7, such as may be performed using an exemplary system 800 as illustrated in FIG. 8. As noted herein above, in certain instances, a CSR may receive a request for a quote by a print buyer along with a physical sample of the box to be created. If not already in a flattened form, the box may need to be first deconstructed into a flattened form, by prying glued seams apart and folding any flaps so that the blank lies on a single plane. In step 710, the CSR captures a digital image of the physical sample using an image capture device 810, such as, for example, a digital camera (such as may be present on a mobile devices such as a phone or tablet) or a scanner. An image captured by a scanner may have a required degree of accuracy based upon known dimensions of the scanner itself, such as image 300 depicted in FIG. 3. An image captured with a digital camera, such as image 400 depicted in FIG. 4, preferably also includes a marker 410 with known geometry and dimensions captured in the same image as blank geometry 420. The exemplary marker depicted in FIG. 4 includes a set of three QR barcodes 412, 414, and 416 with known dimensions and separations from one another. Each QR code may provide information about the dimensions and absolute locations of each code.

In step 720, the CSR then transmits the captured image of the physical sample along with order information (quantity needed, type of stock, etc.) to an input 822 of an estimation system 820, such as via uploading the information using a preconfigured user interface. The image may then be stored in memory 826. As is well understood by those of skill in the art, the step of capturing an image may comprise storing the image locally in digital memory, which may reside locally in the camera or phone and/or remotely "in the cloud." The step of inputting the image to the estimation system may comprise, for example, using a user interface of the estimation system, which may be accessible over a network (e.g. the Internet) to select the digital image from storage (e.g. by typing a file name or "browsing" a list of files or icons and selecting the desired file) and instructing upload. In other embodiments, the image capture device may be connected (via a network or hard-wired) directly to the estimation system such that the image as captured resides in storage associated with the estimation system (which storage may be local or cloud based). Notably, the image capture device (scanner, phone) may be considered connected to the computer processor of the estimation system so long as the computer processor is connected to a network (e.g. the Internet) to which the capture device is also connected, even if other intermediate devices may be required to transfer the image to the processor. For example, an email from the scanner may be received via the Internet by a user on a first computer, who saves that image to digital storage, and then uploads that image to the processor, which may reside on a second computer. In other embodiments, the scanner or camera may be connected to digital storage on a network, and the computer processor may be configured to directly retrieve the image from the digital storage.

Figure 6:
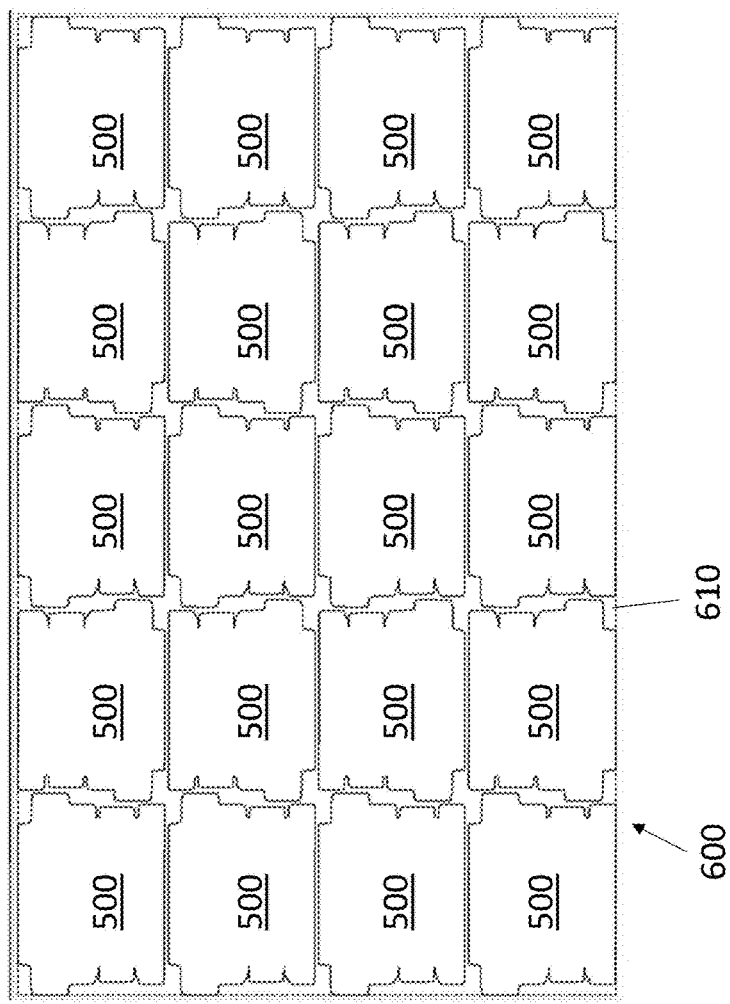
FIG. 6 is an exemplary layout of the blank of FIG. 5 on a sheet.
Figure 5:
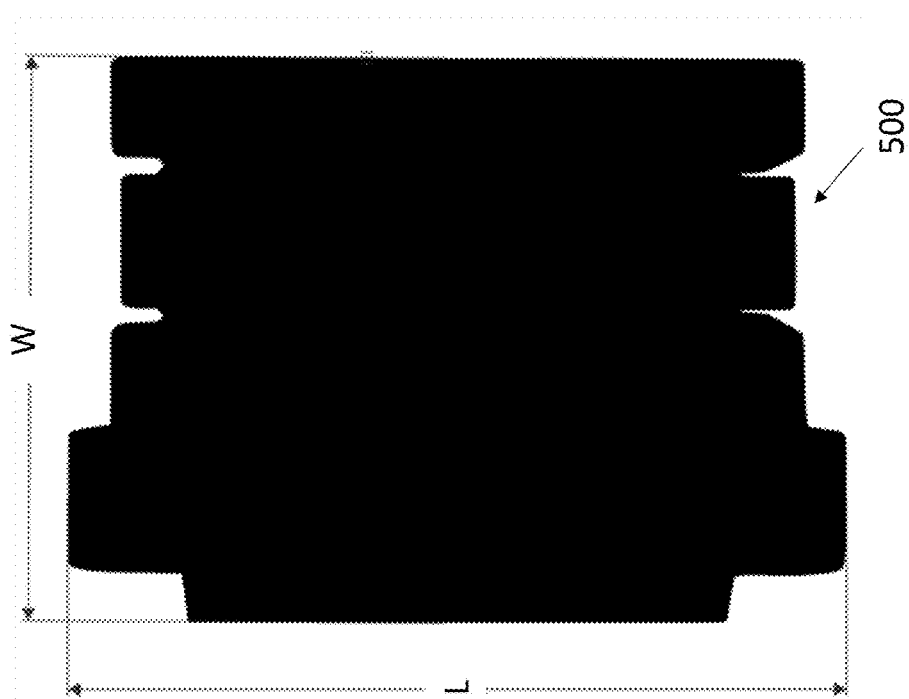
FIG. 5 is an exemplary blank as derived by a computer processor in accordance with an embodiment of the invention.

Estimation system 820 comprises at least a processor programmed with instructions for carrying out method steps for generating an estimate based upon the image and information input received via input 822. The estimation system is programmed to perform step 730 to derive an accurate digital representation (CAD design) of the relevant part of the blank shape, as described in more detail herein. For estimation purposes, this relevant part may only need to include the outer periphery (or hull) of the blank, such as blank 500 depicted in FIG. 5, with length L and width W dimensions that are accurate to within a specific degree of accuracy (e.g. plus or minus 0.2 mm or less). For creating a production CAD design, however, more details like the position of the crease lines may be relevant. In step 740, one or more layouts are then generated for a set of one or more sheets using the digital representation of the blank 500, such as layout 600 as depicted on sheet 610 in FIG. 6. The set of one or more sheets may include a single sheet having a fixed set of dimensions, a plurality of sheets each having a different fixed set of dimensions, or a plurality of sheets having a variable set of dimensions including at least one of a width or a length having a range of dimensions having a minimum and a maximum.

In step 750, estimation system 820 then automatically derives the folding carton board cost for producing the required amount of boxes for every sheet size, and the data is output by the estimation system via output 824, to a receiver 830. Receiver 830 may comprise, for example, a management information system (MIS) used by the CSR or any type of information viewer accessible to a CSR. Receiver 830 may comprise a display, such as a screen of a computer or mobile phone or tablet, for viewing the information on a web page accessible to the CSR, or as embodied in an electronic communication sent to an address associated with the CSR. Remaining portions of the production costs and final rendering of a price quote for the customer may be performed fully automatically, if suitable predetermined information (e.g. die making costs, production time, printing costs, shipping costs, margin) is pre-programmed into the estimation system, or in some embodiments, the CSR may integrate the folding carton board cost provided by the system into a more complete cost estimate manually or using other well-known processes. In particular, the system may be programmed to calculate die-making cost based upon linear units of die materials required and production time for each candidate layout based upon each of the plurality of layouts, or may be programmed to provide estimates based on matching the CAD design to a database of reference CAD designs, as described further herein. The processor may further be programmed to select an optimal cost solution from the plurality of candidate layouts.

Figure 9A:
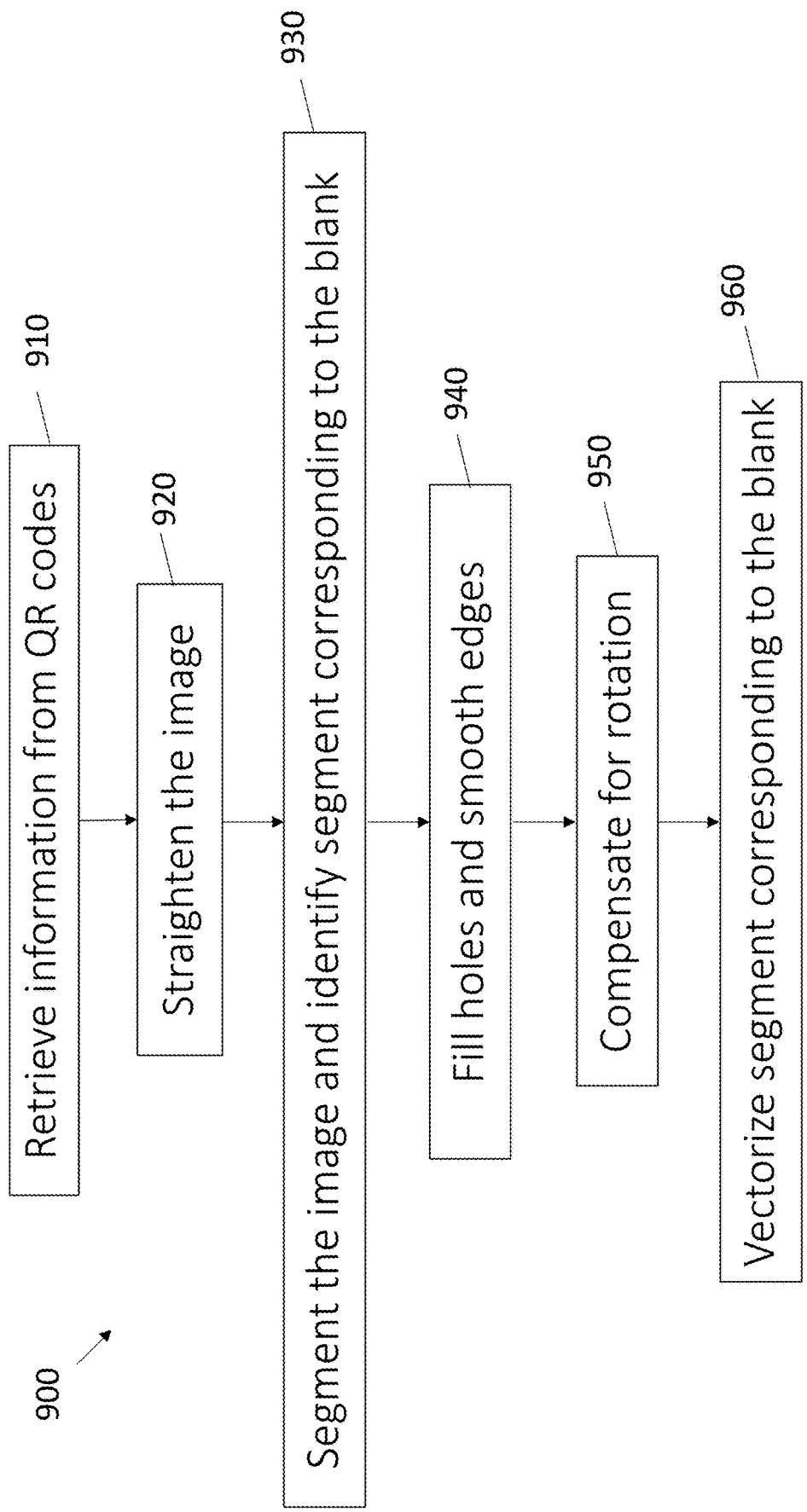
FIG. 9A is a flowchart corresponding to an embodiment of one aspect of the invention for processing a camera image with a marker into a suitable CAD design mask.

Deriving the accurate digital representation in step 730 may include any number of processing steps, such as compensating for rotation, perspective and scaling to come to an accurate digital representation of the blank (CAD design file). An exemplary derivation process 900, as depicted in FIG. 9A, includes in step 910, retrieving information from the QR codes captured in the image, which includes information about the absolute positions and dimensions of the QR codes. The QR code information may be encoded directly in the QR codes themselves, or the QR codes may identify a predetermined location in a database where the information about the positions and dimensions is located (e.g. a URL corresponding to a network address and data storage location on the network accessible to the processor). It should be understood that although described herein in an embodiment in which the fiducials used for compensating the image comprise three QR codes, embodiments with fewer than three such codes may be provided, so long as information relating to the marker is otherwise accessible to the system. For example, a suitable marker may comprise a single QR code and two non-coded shapes, wherein the single QR code (or data storage linked to that code) provides data about the QR code and the other two fiducials sufficient to use any distortions in the geometries of the respective fiducials to derive the information needed. In yet another embodiment, rather than a QR code, the relevant information may be encoded in another way, such as in computer (and human) readable text, or using any other unique identifier that corresponds to known information. Furthermore, although the 3 QR codes are positioned in a formation corresponding to the vertices of a right triangle, the geometric distribution of the QR codes (or other fiducials) is not limited to any particular geometry, so long as that geometry is known and usable by the processor to calculate the dimensions and otherwise compensate for artifacts introduced by the image capture process. Finally, although discussed extensively herein in the context of embodiments using QR codes as the fiducials, it should be understood that the invention is not limited to the use of any particular type of fiducial, nor only to use of fiducials embodying, providing access to, or otherwise presented in combination with encoded information. Fiducials of any predetermined geometry, size and position may be used, so long as the predetermined geometry, position and size are known to the processor when performing the processing steps.

In step 920, the processor uses the four corner points of each of the QR codes (or other fiducials) to derive a homography that is applied for straightening the image (e.g. removing distortion caused by camera angle, scaling, or rotation). Notably, even the most rudimentary digital cameras now include various compensations for camera lens distortion, and thus the image as captured and provided to the processor has typically already been compensated accordingly. In embodiments in which the image has not been compensated, lens distortion compensation may optionally be performed before step 920 using any of the many known techniques in the prior art. The resolution in pixels per unit dimension (e.g. dots per inch (DPI)) of the image is also recorded based upon the QR code dimensions. In step 930, the processor segments the image and identifies the segment corresponding the physical sample of the blank. Such identification may be based upon the known characteristics of the marker, positions of the QR codes, and information about the background derivable from the known information about the marker. In step 940, the processor fills holes and smooths edges of the blank as identified in the prior step. In step 950, the system determines rotation and compensates for rotation. For example, parallel straight edges on opposite sides of the blank, or ninety degree angles between adjoining edges may be identified and snapped to a horizontal/vertical grid. The foregoing steps may be performed on a raster image or vectorized image, but in embodiments in which a raster image is used, the system vectorizes the segment of the image corresponding the physical sample of the blank, and formats that vector information into a CAD design for storage as a CAD design file.

It should be noted that while described above in connection with embodiments in which the image is captured by the CSR, embodiments may be implemented in which the image is captured by the interested customer. For example, a graphics file (e.g. a PDF) with the marker can be sent to a customer, printed by the customer, and placed adjacent the blank by the customer when capturing an image of the blank. Likewise, a customer may capture the scanned image using a scanner. In some cases, the customer may need to use an approved printer for printing the marker or an approved scanner, or information about the printer/scanner communicated to the CSR so that any irregularities introduced by the customer's printer or scanner are known and compensated for when processing the image. In other instances, the CSR may send the customer (in particular a repeat or otherwise known customer) a pre-printed marker or may pre-register a scanner so that images sent to the CSR by the customer are reliably validated.

Figure 9B:
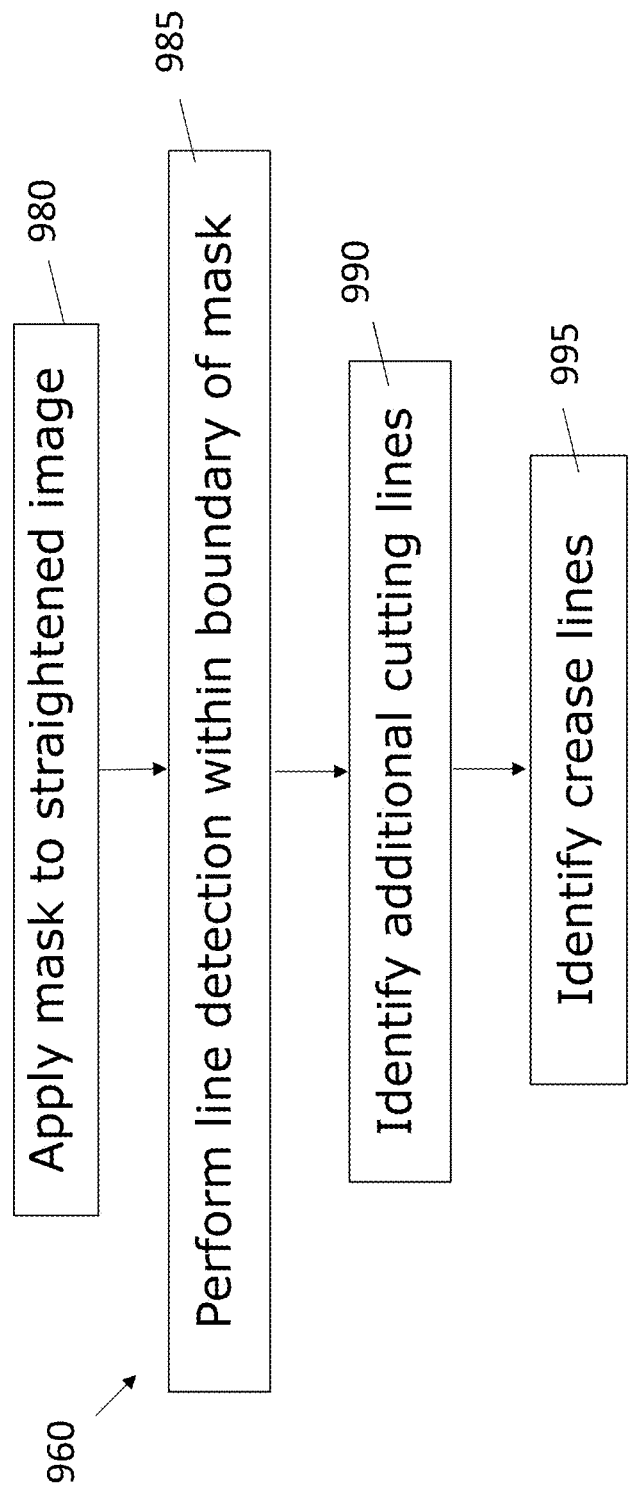
FIG. 9B is a is a flowchart corresponding to an embodiment of one aspect of the invention for deriving cut and/or crease lines from CAD design mask derived from an image of a physical specimen.

After the blank geometry has been isolated (sometimes referred to as a "mask") and defined as a CAD design from a captured image in a first phase of processing, a second phase of processing may be performed to determine cut and/or crease lines within the boundaries of the mask. An exemplary processing method 970 for this second phase is outlined in FIG. 9B. After calculating the mask and the cutting lines in the first phase, the mask is applied to the straightened image in step 980. Line detection is then performed within the portion of the image bounded by the mask in step 985, using one of many line detection algorithms known in the art. An exemplary line detection algorithm includes but is not limited to the Hough Line Transform, as described in U.S. Pat. No. 3,069,654, and by Duda and Hart, "Use of the Hough Transformation to Detect Lines and Curves in Pictures," *Comm. ACM*, Vol 15, No. 1, pp. 11-15 (January 1972), both of which are incorporated herein by reference. In step 990, all lines connected on one side to the cutting lines detected in the first phase will be interpreted as additional cutting lines. Then, in step 995, all lines connecting two cutting lines (as identified in the first processing phase or in step 990) are interpreted as crease lines.

Figure 10B:
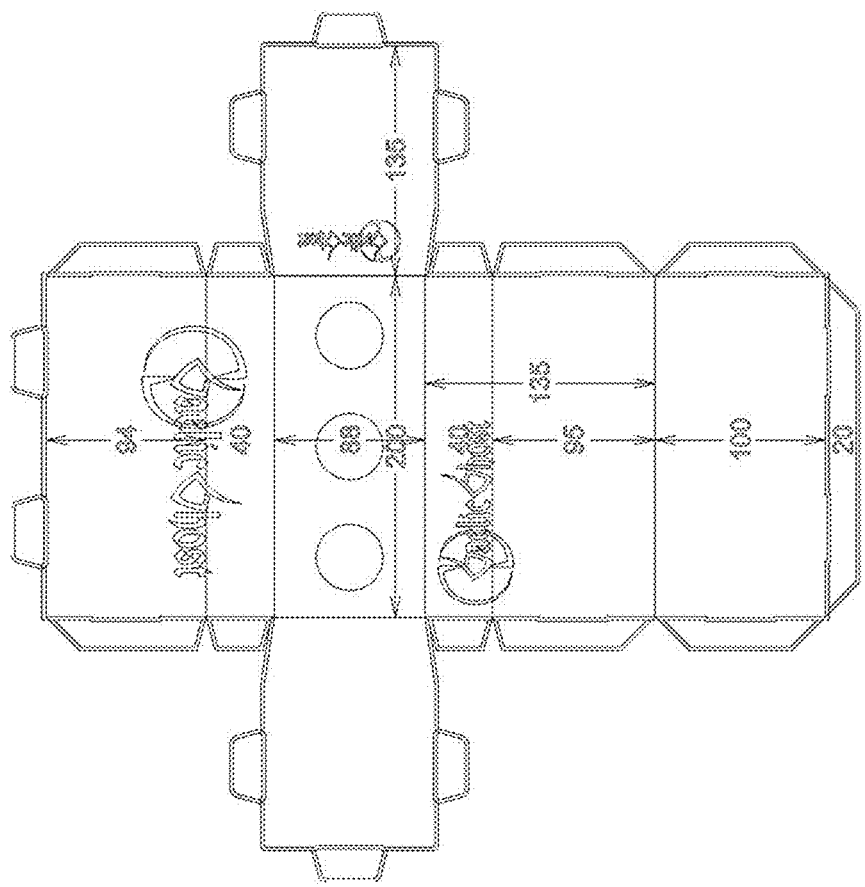
FIG. 10B depicts an exemplary separation layer from the file of FIG. 10A, showing die-line information mixed with other information and in need of further processing for converting into a CAD design.
Figure 10A:
FIG. 10A depicts an exemplary graphics rendering from an exemplary PDF file for processing into a CAD design.
Figure 10C:
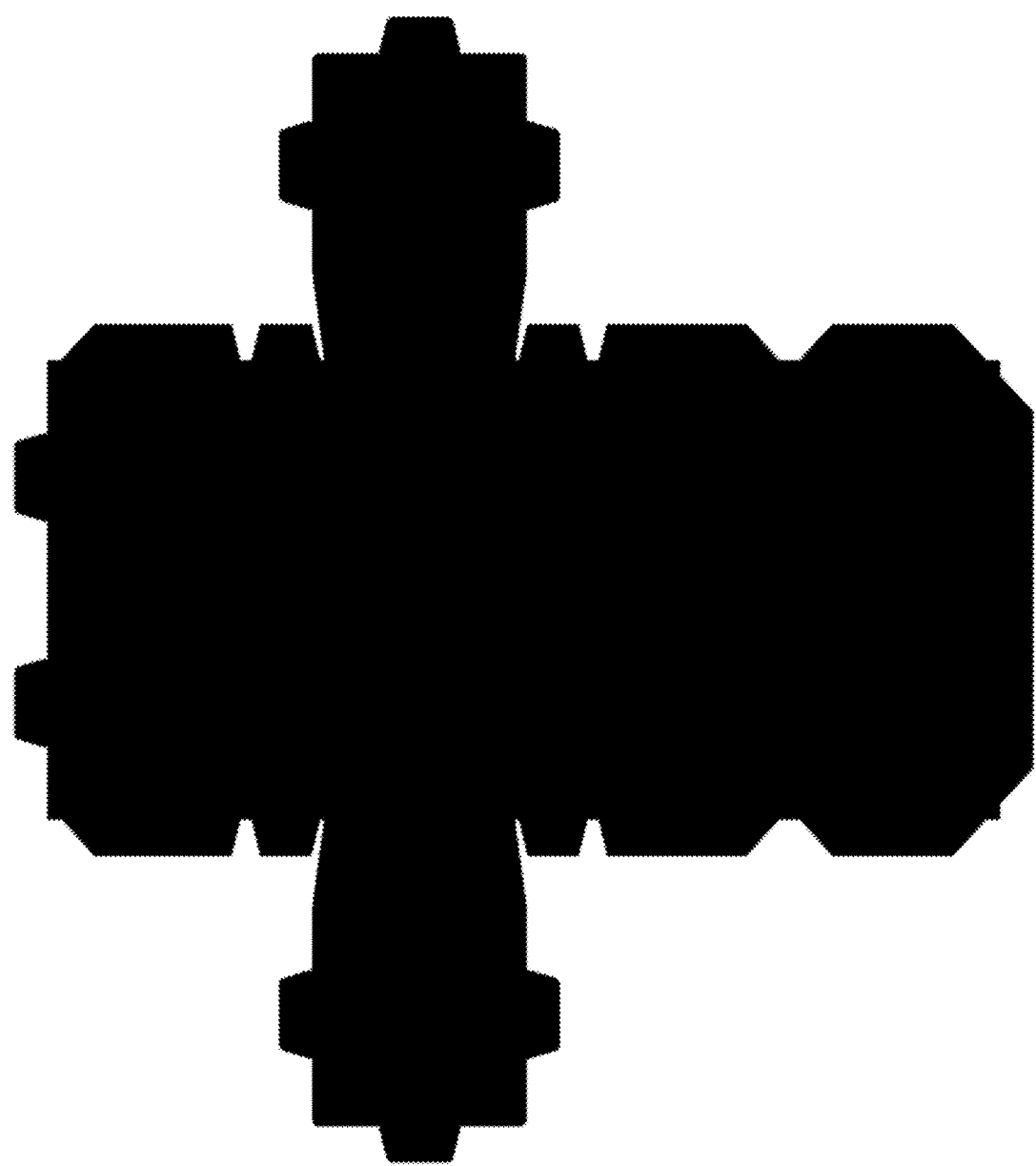
FIG. 10C depicts an exemplary CAD design mask derived from the information depicted in FIG. 10B.

As described above in the background, sometimes a request for a quote may instead be based upon a cluttered graphics file that does not have accurate embedded dimensional information (e.g. a PDF lacking metadata, such as an Optional Content Group or usage of colorants for fill or stroke, that define cut or crease lines separately from surrounding content). An exemplary embodiment for deriving a CAD design from such a PDF will now be described. Depicted in FIG. 10A is an image corresponding to a graphics file (although shown in monochrome, the graphics may include color). FIG. 10B depicts a separation from the image of FIG. 10A, showing that such a separation contains many other objects in addition to the outline of the blank, such as measurements, bleed lines, as well as graphic content for printing on the resulting packaging. FIG. 10C depicts the blank geometry isolated from the objects depicted in FIG. 10B. Further processing may then be performed to identify cut and/or crease lines located within the outline of the blank geometry, as further described herein.

Figure 11A:
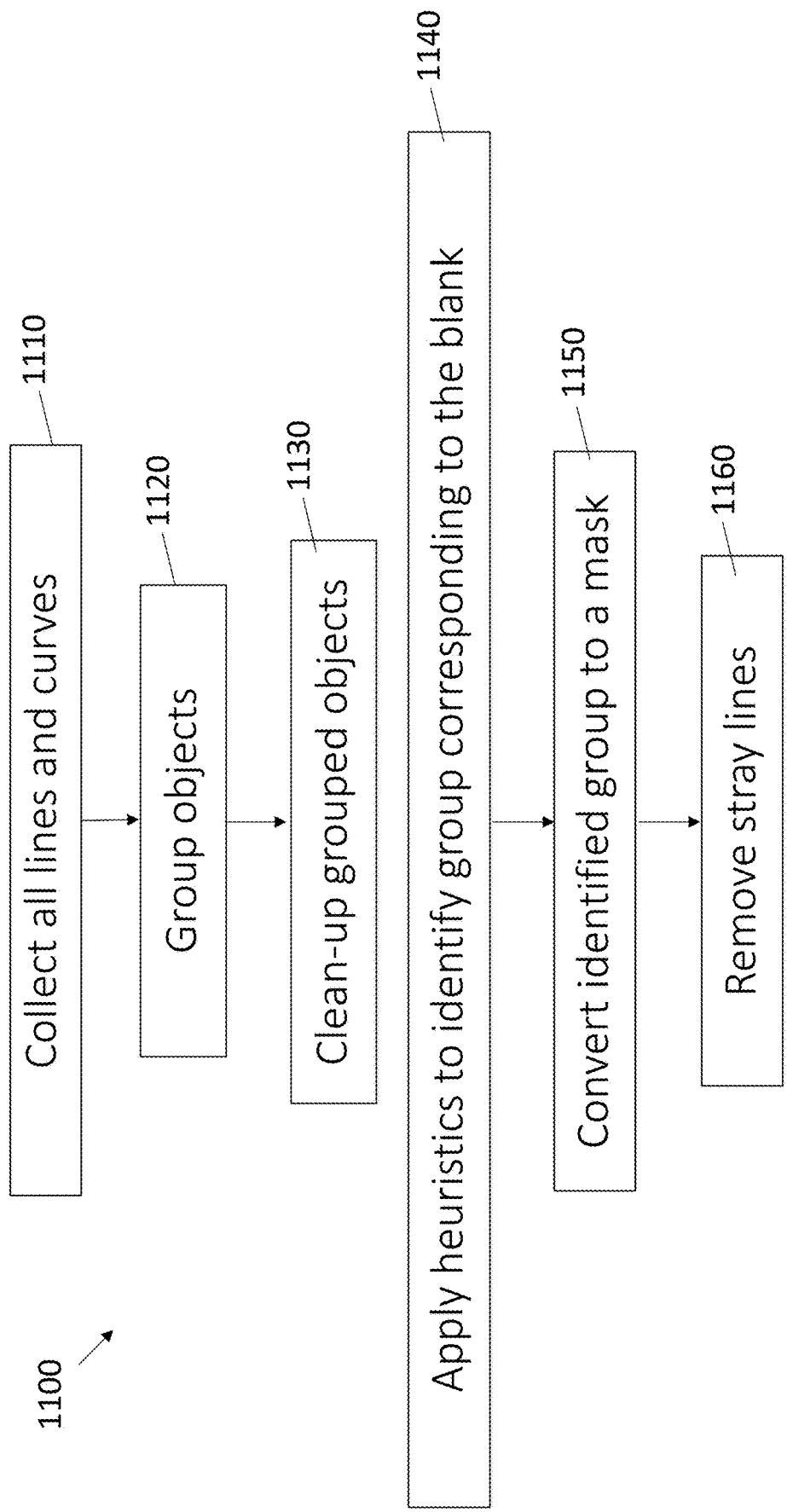
FIG. 11A is a flowchart corresponding to an embodiment of one aspect of the invention for converting a cluttered graphics file lacking metadata to a CAD design mask.

An exemplary algorithm 1100 for processing the graphics file is illustrated in FIG. 11A, and may include first collecting all of the lines and curves from the correct separation (in step 1110, and then grouping the objects in accordance with one or more rules in step 1120. An exemplary rule may include grouping objects together if and only if: (a) one of their endpoints touches the other object, or (b) they use the same stroke style. Applying this rule provides a plurality of groups representing different components like the bleed line, a legend, or the box itself. In step 1130, the groups are cleaned up using known algorithms to remove dangling lines and arrows and to close any gaps where lines are within a sufficient distance to one another to be considered touching, but do not actually touch. The group corresponding to the blank can be identified from the plurality of groups in step 1140 using a plurality of different heuristics, such as for example (a) the group with the most components; (b) the group with the largest surface area; and (c) the group closest to a predefined length and width.

The identified group is then processed in step 1150 to convert it to a mask, such as for example, performing the steps of: (1) rendering the group at a large DPI; (2) applying a flood fill on the outside of the box, and (3) inverting the flood-filled image. The foregoing steps result in a mask that may potentially still contain a few lines pointing outside. To remove additional lines in step 1160, the processor may apply a 1 pixel erosion followed by a 1 pixel dilation. The foregoing may be performed on a rastered image or a vector image, but if performed on a rastered image, the rastered image may then be vectorized, such as by any algorithm known in the art for such a purpose, including but not limited to the polygon-based tracing algorithm known as Potrace (*Potrace: a polygon-based tracing algorithm*, Peter Selinger Sep. 20, 2003; http://potrace.sourceforge.net/potrace.pdf), incorporated herein by reference.

Figure 11B:
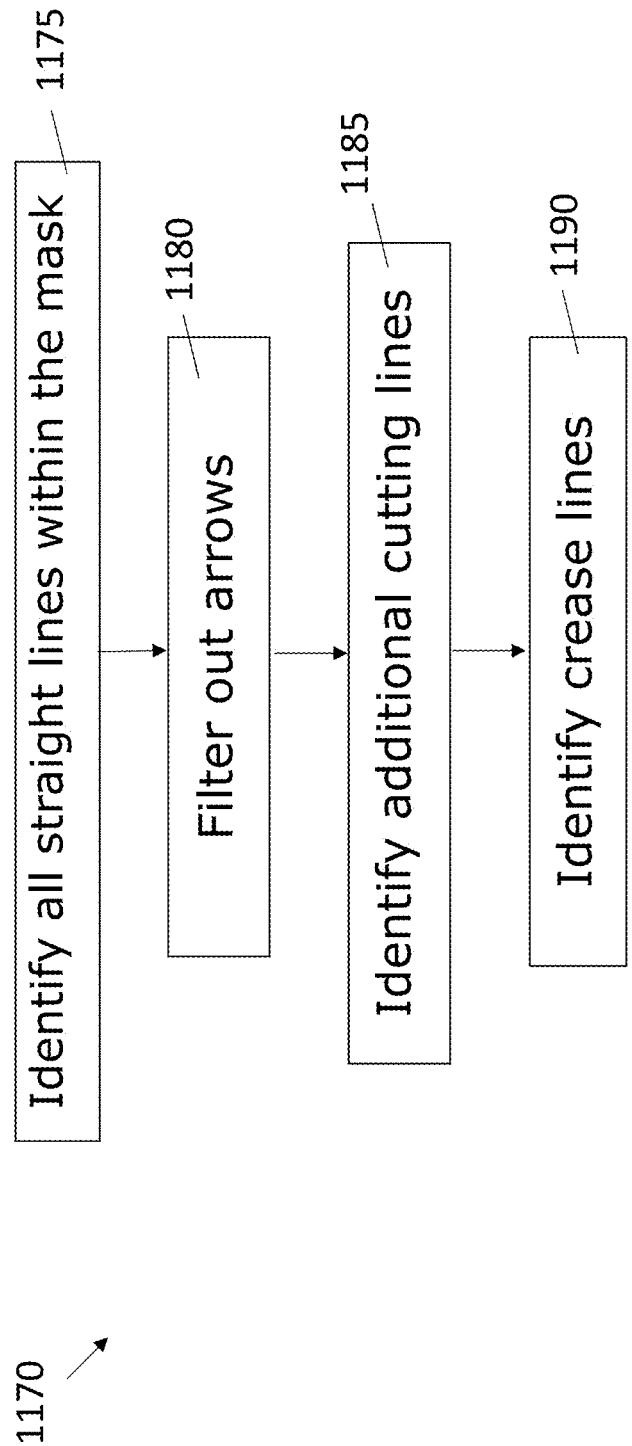
FIG. 11B is a is a flowchart corresponding to an embodiment of one aspect of the invention for deriving cut and/or crease lines from CAD design mask derived from a cluttered graphics file.

After the mask has been isolated and defined as a CAD design from the cluttered graphics file, additional processing may be performed to determine cut and/or crease lines within the boundaries of the mask. An exemplary processing method 1170, depicted in FIG. 11B, may include in step 1175 first identifying all straight lines within the mask, then in step 1180 filtering out arrows by any way known in the art, such as by finding large lines connected to smaller lines at a certain angle (that form an open arrow head) or by finding small triangles (closed arrow heads) connected to larger lines. In step 1185, all lines connected on one side to the cutting lines detected in the first phase are interpreted as additional cutting lines. In step 1190, all lines connecting two cutting lines (as identified in the first phase or in step 1185) are interpreted to be crease lines.

The foregoing method has been found successful in finding the die line in a PDF or other cluttered graphics file in which the data corresponding to the geometry of the blank is included together with other data such as dimension lines, legends, additional text boxes or marks that makes it difficult to automatically distinguish the CAD data from other data.

Exemplary embodiments can successfully derive the actual die line by providing only two pieces of data: blank width and blank height, which is the data a CSR typically has available when an estimate is requested. Thus, the estimation processor may be programmed with instructions both for deriving CAD data from an image and from a PDF.

Although the methods and systems as described herein may have specific benefits for estimation and price quoting (i.e. determining production cost to provide a price quote to a prospective customer), they are not limited to such uses. A CAD design derived form an image or a PDF as described herein may be used for any purpose, such as for example, for creating the CAD design and layouts for production use after the customer places an order. Thus, the systems and methods as discussed herein for automatically generating a CAD design may also be used by a CAD designer as a starting point for creating further CAD designs and layouts for use in production. Accordingly, the methods as described herein may significantly speed up the design process.

When used for estimation, additional process steps and system modules may be helpful in streamlining the estimation process and improving its accuracy. For example, once the CAD design is generated from the image, exemplary methods may include searching a database of reference CAD designs for a CAD design that is identical or very similar to the CAD design generated from the image. The database may reside in digital memory, such as a computer memory library, computer library on disk, or a computer library in a local database or a cloud database.

As depicted in FIG. 8, computer memory 826 schematically represents digital memory of any sort accessible to the computer processor by any means, which memory may store any machine readable instructions for carrying out the methods of the invention, including but not limited to instructions executable by the computer for carrying out the method steps, the non-CAD files and CAD files as described herein, databases as referenced herein in any context, including a database of CAD designs, a database of information corresponding to the QR codes, and other databases referenced herein later. Although shown as a single unit, the digital storage may encompass numerous units of digital memory media, including RAM or ROM, local or remote, portable or non-portable.

When a match or near match is found after searching, the reference CAD design can be used as a substitute for the derived CAD Design for estimation or production purpose. In some embodiments, the method may include searching a database of existing parametric template CAD designs (a template CAD design with dimensional variables e.g. length, width, depth). If there is a match or near match between the CAD design generated from the non-CAD file and a template CAD design for a specific set of dimensional values, the existing template CAD design instantiated with that set of dimensional values may be considered a parametrically equivalent design that can be used as a substitute for the derived CAD Design for estimation or production.

Additional embodiments may also include searching a database of existing layouts for the specific CAD design derived from the non-CAD file. If the search of the database results in a match, no new layout needs to be made for estimation or production. For a specific existing layout, a search can be performed in a database of die cutter tools for tools made for the specific layout. If a die cutter tool already exists for the required layout, no new die tools are needed, which may result in a lower cost in the cost estimate, or may save the step of making new die cutter tools in production.

Although the foregoing illustrates the needs from the perspective of folding carton box production, this is only one example of a desirable implementation for the invention as described herein. The invention is not limited to any specific use, and may be applied without limitation to any process that benefits from automatically deriving dimensionally accurate CAD information from an image or PDF, including in other segments of the packaging industry, including but not limited to making labels, flexibles, POS displays, and the like.

Although described herein with respect to different methods for deriving a CAD design from non-CAD design files comprising a captured image or a cluttered graphics file or by matching information in the non-CAD design file to information in a searchable database, it should be understood that an ideal system may be configured to perform more than one, if not all, of the foregoing methods. Accordingly, the user of such a system will have multiple ways of potentially minimize the time and effort required to convert non-CAD design information into a CAD design, such as for estimation purposes, as described herein. It should also be understood that the methods as described herein may not deliver a CAD design that is 100% accurate in 100% of instances, and that in some cases, additional manipulation of the CAD design by a CAD operator may be required to achieve the ideal CAD design for estimation purposes.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method implemented by a computer for creating a computer-aided design (CAD) corresponding to a 2-dimensional rendering of an unfolded blank configured for manipulation into a 3-dimensional shape, the method comprising the steps of:
   (a) obtaining, in a computer processor, a first digital, non-CAD design file comprising an image file containing information relating to the unfolded blank geometry, the non-CAD design file having an absence of metadata that defines cut or crease lines separately from surrounding content;
   (b) deriving, with the computer processor, a digital representation of the unfolded blank geometry based upon the first digital non-CAD design file, the digital representation including defined data corresponding to a shape having one or more defined cut and/or crease lines, wherein deriving the digital representation comprises the processor performing the steps of:
   generating a CAD design mask comprising a first set of one or more cutting lines that form a boundary; and
   performing a line detection algorithm within the portion of the image bounded by the mask, the line detection algorithm configured to identify one or more of:
   a second set of one or more cutting lines as one or more lines connected on one side to the first set of cutting lines; and
   one or more crease lines as one or more lines connecting two lines selected from the first set of cutting lines and the second set of cutting lines.

2. The method of claim 1, wherein the image file includes a marker with known geometry and dimensions, wherein the step of deriving the digital representation includes using the marker to determine dimensions of the unfolded blank.

3. The method of claim 2, wherein the step of deriving the digital representation further includes using the marker to identify and compensate for artifacts in the image.

4. The method of claim 3, wherein the artifacts in the image are selected from the group consisting of: rotation relative to a preferred rotation, perspective relative to a plan view, and scaling.

5. The method of claim 2, wherein the marker comprises a plurality of fiducials distributed in a pattern.

6. The method of claim 5, wherein the marker comprises one or more QR codes.

7. The method of claim 6, wherein the marker comprises three QR codes positioned in locations corresponding to vertices of a right triangle.

8. The method of claim 5, wherein the marker embodies encoded information readable by a machine as dimensional and positional information about the plurality of fiducials.

9. The method of claim 5, wherein encoded information is readable by a machine as identifying information of an address on a network accessible to the machine where machine-readable dimensional and positional information about the plurality of fiducials is stored.

10. The method of claim 2, further comprising compensating for artifacts in the image to produce a straightened image,
and applying the mask to the straightened image.

11. The method of claim 1, wherein the information comprises one or more lines in a cluttered graphics file.

12. The method of claim 1, further comprising the processor performing the step of:
(c) searching the digital representation derived from the non-CAD design file in step (b) in a digital memory for a stored reference digital representation that is a match to the derived digital representation, and using the stored reference digital representation as a substitute digital representation.

13. The method of claim 1, further comprising the processor performing the steps of:
(c) searching the digital representation derived from the non-CAD design file in step (b) in a digital memory for a stored template CAD design that, when instantiated with a specific set of parametric values, is a match to the derived digital representation, and using the template CAD design instantiated with the set of parametric values as a substitute digital representation.

14. The method of claim 1, wherein the unfolded blank is configured to be manipulated along the cut and crease lines into the 3-dimensional shape of a packaging box.

15. A method implemented by a computer for creating a computer-aided design (CAD) corresponding to a 2-dimensional rendering of an unfolded blank configured for manipulation into a 3-dimensional shape, the method comprising the steps of:
(a) obtaining, in a computer processor, a first digital, non-CAD design file containing information relating to the unfolded blank geometry, the non-CAD design file comprising a graphics file having an absence of metadata that defines cut or crease lines, the information including one or more lines in a cluttered graphics file;
(b) deriving, with the computer processor, a digital representation of the unfolded blank geometry based upon the first digital non-CAD design file, the digital representation including defined data corresponding to a shape having one or more defined cut and/or crease lines, wherein deriving the digital representation includes the processor performing the substeps of:
collecting lines and curves from the cluttered graphics file and associating each of the collected lines and curves into one or more groups in accordance with one or more grouping rules;
cleaning up each of the one or more groups to remove dangling lines and arrows and to close any unwanted gaps between lines;
identifying which of the one or more groups corresponds to the blank; and
converting the identified group to an isolated CAD design mask comprising first set of one or more cutting lines that form a boundary.

16. The method of claim 15, wherein the cluttered graphics file comprises a PDF file lacking metadata that defines cut or crease lines.

17. The method of claim 16, wherein the PDF file lacks an Optional Content Group that defines cut or crease lines and lacks usage of colorants for fill or stroke that allow identification of PDF paths corresponding to cut or crease lines.

18. The method of claim 15, further comprising the processor further processing the isolated CAD design mask by performing the substeps of:
identifying all straight lines within the mask boundary;
removing arrows;
identifying lines connected on one side to the first set of cutting lines as one or more additional cutting lines in a second set of cutting lines; and
identifying lines connecting two lines from the first or second sets of cutting lines as crease lines.

19. The method of claim 15, further comprising the processor performing the step of:
searching the digital representation derived from the non-CAD design file in step (b) in a digital memory for a stored reference digital representation that is a match to the derived digital representation, and using the stored reference digital representation as a substitute digital representation.

20. The method of claim 15, further comprising the processor performing the steps of:
searching the digital representation derived from the non-CAD design file in step (b) in a digital memory for a stored template CAD design that, when instantiated with a specific set of parametric values, is a match to the derived digital representation, and using the template CAD design instantiated with the set of parametric values as a substitute digital representation.

21. A method implemented by a computer for creating a computer-aided design (CAD) corresponding to a 2-dimensional rendering of an unfolded blank configured for manipulation into a 3-dimensional shape, the method comprising the steps of:
(a) obtaining, in a computer processor, a first digital, non-CAD design file containing information relating to the unfolded blank geometry, the non-CAD design file having an absence of metadata that defines cut or crease lines separately from surrounding content;
(b) deriving, with the computer processor, a digital representation of the unfolded blank geometry based upon the first digital non-CAD design file, the digital representation including defined data corresponding to a shape having one or more defined cut and/or crease lines;
(c) defining, with the computer processor using the digital representation or substitute digital representation, a plurality of candidate layouts on a set of one or more sheets, including searching in a digital memory library for one or more pre-existing stored candidate layouts containing a blank geometry identical to the derived digital representation; and (d) calculating material consumption costs associated with each of the plurality of candidate layouts.

22. The method of claim 21, further comprising calculating die making cost and production time for each candidate layout; and selecting an optimal cost solution from the plurality of candidate layouts.

23. The method of claim 21, wherein the set of one or more sheets comprises a single sheet having a fixed set of dimensions, a plurality of sheets each having a different fixed set of dimensions, or a plurality of sheets having a variable set of dimensions including at least one of a width or a length having a range of dimensions having a minimum and a maximum.

24. The method of claim 21, further comprising identifying from information stored in the digital memory library the existence of a premade die corresponding to one or more of the pre-existing stored candidate layouts.

25. A system for creating a computer-aided design (CAD) file corresponding to a 2-dimensional rendering of an unfolded blank configured for manipulation into a 3-dimensional shape, the system comprising:
   a computer processor;
   non-transitory machine-readable media accessible by the computer processor and comprising instructions readable by the computer processor for:
   a) defining a first digital non-CAD design comprising an image file containing information relating to the unfolded blank having an absence of metadata that defines cut or crease lines separately from surrounding content; and
   b) causing the processor to execute steps for deriving a digital representation including defined data corresponding to a shape having one or more defined cut or crease lines of the unfolded blank based upon the first digital non-CAD design file, wherein deriving the digital representation comprises generating a CAD design mask comprising a first set of one or more cutting lines that form a boundary; and performing a line detection algorithm within the portion of the image bounded by the mask, the line detection algorithm configured to identify one or more of: a second set of one or more cutting lines as one or more lines connected on one side to the first set of cutting lines, and one or more crease lines as one or more lines connecting two lines selected from the first set of cutting lines and the second set of cutting lines.

26. The system of claim 25, further comprising an image capture device configured to create the image file and connected to a common network with the machine-readable media accessible by the computer processor.

27. The system of claim 26, wherein the image capture device comprises a scanner.

28. The system of claim 26, wherein the image capture device comprises a digital camera.

29. The system of claim 26, wherein the image file includes a marker with known geometry and dimensions, wherein the computer processor is programmed with instructions for using the marker to determine dimensions of the unfolded blank for the digital representation.

30. The system of claim 25, further comprising a digital memory, wherein the computer processor is configured to match the information from the non-CAD design file to a stored digital representation in a digital memory, search for one or more pre-existing stored candidate layouts in the digital memory, or a combination thereof.

31. The system of claim 30, wherein the digital memory comprises a computer memory library, library on disk, library in a local database or a cloud database.

32. The system of claim 29, wherein the marker comprises a plurality of fiducials distributed in a pattern, one or more of the fiducials comprising a QR code having a predetermined geometry and dimensions.

33. A system for creating a computer-aided design (CAD) file corresponding to a 2-dimensional rendering of an unfolded blank configured for manipulation into a 3-dimensional shape, the system comprising:
   a computer processor;
   a digital memory;
   non-transitory machine-readable media accessible by the computer processor and comprising instructions readable by the computer processor for:
   a) defining a first digital non-CAD design comprising a graphics file containing information relating to the unfolded blank having an absence of metadata that defines cut or crease lines separately from surrounding content; and
   b) causing the processor to execute steps for deriving a digital representation including defined data corresponding to a shape having one or more defined cut or crease lines of the unfolded blank based upon the first digital non-CAD design file
   (c) using the digital representation to define a plurality of candidate layouts on a set of one or more sheets, including searching a library stored in the digital memory for one or more pre-existing stored candidate layouts containing a blank geometry identical to the derived digital representation; and
   (d) calculating material consumption costs associated with each of the plurality of candidate layouts.

34. The system of claim 33, wherein the digital representation comprises a computer aided design (CAD) file.

35. A system for creating a computer-aided design (CAD) file corresponding to a 2-dimensional rendering of an unfolded blank configured for manipulation into a 3-dimensional shape, the system comprising:
   a computer processor;
   non-transitory machine-readable media accessible by the computer processor and comprising instructions readable by the computer processor for:
   (a) defining a first digital non-CAD design comprising a PDF file having an absence of metadata that defines cut or crease lines, the PDF file containing information relating to the unfolded blank including one or more lines in a cluttered graphics file; and
   (b) causing the processor to execute steps for deriving a digital representation including defined data corresponding to a shape having one or more defined cut or crease lines of the unfolded blank based upon the first digital non-CAD design file, the non-CAD design file comprising the information, wherein deriving the digital representation includes the processor performing the substeps of:
   collecting lines and curves from the cluttered graphics file and associating each of the collected lines and curves into one or more groups in accordance with one or more grouping rules;
   cleaning up each of the one or more groups to remove dangling lines and arrows and to close any unwanted gaps between lines;

identifying which of the one or more groups corresponds to the blank; and converting the identified group to an isolated CAD design mask comprising first set of one or more cutting lines that form a boundary.

* * * * *